United States Patent [19]

Inoue et al.

[11] Patent Number: 4,734,479
[45] Date of Patent: Mar. 29, 1988

[54] ROOM TEMPERATURE-CURABLE ORGANOPOLYSILOXANE COMPOSITION

[75] Inventors: Yoshio Inoue; Masatoshi Arai; Koji Yokoo, all of Gunma, Japan

[73] Assignee: Shin-Etsu Chemical Co., Ltd., Tokyo, Japan

[21] Appl. No.: 27,263

[22] Filed: Mar. 18, 1987

[30] Foreign Application Priority Data

Mar. 25, 1986 [JP] Japan .................................. 61-66497

[51] Int. Cl.$^4$ .............................................. C08G 77/06
[52] U.S. Cl. ..................................... 528/18; 524/765; 524/860; 524/861; 524/379; 524/588; 525/478; 528/29; 528/31; 528/32; 528/33; 528/34; 528/901
[58] Field of Search ....................... 528/18, 31, 33, 32, 528/34, 901, 29; 524/765, 860, 861, 379, 588; 525/478

[56] References Cited

U.S. PATENT DOCUMENTS

| | | | |
|---|---|---|---|
| 4,371,682 | 1/1983 | Hashimoto | 528/34 |
| 4,417,042 | 11/1983 | Dziark | 528/18 |
| 4,426,509 | 1/1984 | Maass et al. | 528/18 |
| 4,515,932 | 5/1985 | Chung | 528/18 |

*Primary Examiner*—Melvyn I. Marquis
*Attorney, Agent, or Firm*—Wyatt, Gerber, Shoup, Scobey and Badie

[57] ABSTRACT

The essential components in the inventive room temperature-curable organopolysiloxane composition are: (A-1) a diorganopolysiloxane of which each terminal silicon atom has a silanolic hydroxy group or two alkoxy groups; (A-2) a filler; (A-3) an alkenyloxy silane, e.g. methyl tri)isopropenyloxy)silane; (A-4) a guanidino-containing organosilicon compound, e.g. 3-(tetramethylguanidino)propyl trimethoxy silane; (A-5) an alcohol, e.g. methyl or ethyl alcohol; (B) an organosilicon compound having a silicon-bonded hydrogen atom; and (C) an organic tin compound as a catalyst. By virtue of the unique formulation above, the composition is very stable in storage in a moisture-free condition for a long period of time without losing the high curability when exposed to a moisture-containing atmosphere.

10 Claims, No Drawings

ROOM TEMPERATURE-CURABLE ORGANOPOLYSILOXANE COMPOSITION

BACKGROUND OF THE INVENTION

The present invention relates to a room temperature-curable organopolysiloxane composition or, more particularly, to a room temperature-curable organopolysiloxane composition of the dealcoholation type having excellent storage stability.

Several classes of room temperature-curable organopolysiloxane compositions, referred to as the RTV compositions hereinbelow, are known in the prior art, of which the so-called dealcoholation type ones are the most important. A dealcoholation type RTV composition typically comprises an organopolysiloxane terminated at each molecular chain end with a silanolic hydroxy group, a crosslinking agent such as methyl trimethoxy silane and a curing catalyst which may be an organic titanium compound or an organic chelate compound of titanium. The curing reaction of the composition to give a rubbery cured product proceeds by the dealcoholation condensation between the silanolic hydroxy groups in the organopolysiloxane and the alkoxy groups in the crosslinking agent to produce an alcohol as the condensation by-product so that the RTV compositions of the dealcoholation type are free from the problems of corrosiveness and offensive odor as in the RTV compositions of other types. Accordingly, the RTV compositions of this type are widely used as an adhesive or other material in the electric and electronic industries.

RTV compositions of the dealcoholation type, however, are not free from some problems and disadvantages. For example, the curing velocity of the composition is usually not high enough and, in particular, complete curing of the composition can hardly be obtained in the core portion of a thick body. Further, the storage stability of the composition is relatively low so that the composition may lose curability after a long period of storage even in an anhydrous condition.

It has been proposed in view of the above mentioned problems that the RTV composition of the dealcoholation type be admixed with a special organosilane compound having two alkoxy groups in a molecule as a so-called silane scavenger to improve the curability and storage stability of the composition. This method, however, is practically not feasible since sufficient improvement of the storage stability can be obtained only when the organosilane compound has a hydrolyzable group other than alkoxy groups having high reactivity such as amido and amino groups while such reactive groups are responsible for corrosiveness and offensive odor of the composition admixed therewith so that the RTV composition can no longer be used as an adhesive in the electric and electronic industries.

SUMMARY OF THE INVENTION

The present invention accordingly has an object to provide a RTV composition of the dealcoholation type free from the above described problems and disadvantages in the conventional RTV compositions of the same type. The improved RTV composition provided by the present invention comprises:

(A) a combination of
 (A-1) 100 parts by weight of a diorganopolysiloxane of which each of the silicon atoms at the molecular chain ends has a silanolic hydroxy group or two alkoxy groups directly bonded thereto,
 (A-2) from 1 to 400 parts by weight of a filler,
 (A-3) an alkenyloxysilane compound represented by the general formula $$R^1{}_n SiX_{4-n}, \qquad (I)$$

in which $R^1$ is a substituted or unsubstituted monovalent hydrocarbon group selected from the class consisting of methyl, ethyl, propyl, vinyl, phenyl and 3,3,3-trifluoropropyl groups, X is an alkenlyloxy group represented by the general formula $$-O-C(CH_2R^3)=CHR^2, \qquad (II)$$

$R^2$ and $R^3$ each being a hydrogen atom or an alkyl group selected from the class consisting of methyl, ethyl and propyl groups, and the subscript n is zero or 1, or a partial hydrolyzate thereof in an amount at least equimolar to the content of hydroxy groups and water contained in the components (A-1) and (A-2) or, in particular, from 0.1 to 5 parts by weight,
 (A-4) from 0.01 to 10 parts by weight of an organosilane or organopolysiloxane compound having, in a molecule, at least one substituted or unsubstituted guanidino group represented by the general formula $$-N=C(NR^4{}_2)_2, \qquad (III)$$

in which $R^4$ is a hydrogen atom or a monovalent hydrocarbon group, and
 (A-5) an alcohol compound represented by the general formula $$R^5OH, \qquad (IV)$$

in which $R^5$ is a monovalent hydrocarbon group, in an amount in the range from equimolar to 20 times by moles of the groups denoted by X in the component (A-3);
(B) an organosilane or organopolysiloxane compound having, in a molecule, at least one hydrogen atom directly bonded to the silicon atom, i.e. silicon-bonded hydrogen atom, in an amount sufficient to provide the silicon-bonded hydrogen atoms in an amount in the range from 0.3 to 1.0 mole per mole of the alcohol compound as the component (A-5); and
(C) an organic tin compound in an amount from 0.01 to 10% by weight based on the component (A), viz. combination of the components (A-1) to (A-5).

It is optional that, in addition to the above defined essential ingredients, the inventive RTV composition comprises (D) an alkoxysilane compound represented by the general formula $$R^6{}_m Si(OR^7)_{4-m}, \qquad (V)$$

in which $R^6$ is a monovalent hydrocarbon group, $R^7$ is an alkyl group or an alkoxy-substituted alkyl group and the subscript m is zero or 1, or a partial hydrolyzate thereof in an amount not exceeding 50% by weight based on the component (A), viz. combination of the components (A-1) to (A-5).

DETAILED DESCRIPTION OF THE PREFERRED EMBODIMENTS

In the above described formulation of the inventive RTV composition, the trialkoxy silane compound in the conventional RTV compositions of the dealcoholation type is replaced with the alkenyloxy silane compound as the component (A-3). This unique formulation has been established on the base of the discovery that the poor curability and storage stability of the conventional dealcoholation type RTV compositions are ascribable to the low reactivity of the alkoxy groups in the trialkoxysilane compound as the crosslinking agent with the silanol groups in the base organopolysiloxane and water contained in the filler to leave the silanol groups unreacted.

Further, the silicon-bonded hydrogen atoms in the component (B) can readily be converted into an alkoxysilyl group by the dehydrogenation reaction with the alcohol compound as the component (A-5) in the presence of the guanidino-containing organosilicon compound as the component (A-4).

The base ingredient in the inventive RTV composition is the diorganopolysiloxane as the component (A-1) of which each of the silicon atoms at the molecular chain ends has one silanolic hydroxy group or two alkoxy groups bonded thereto. The diorganopolysiloxane is represented by the average unit formula

$$R_a SiO_{(4-a)/2}, \qquad (VI)$$

in which R is a substituted or unsubstituted monovalent hydrocarbon group exemplified by alkyl groups, e.g. methyl, ethyl, propyl, butyl, 2-ethylbutyl and octyl groups, cycloalkyl groups, e.g. cyclohexyl and cyclopentyl groups, alkenyl groups, e.g. vinyl, allyl and hexenyl groups, aryl groups, e.g. phenyl, tolyl, naphthyl and diphenyl groups, and aralkyl groups, e.g. benzyl and 2-phenylethyl groups, as well as those substituted groups obtained by replacing a part or all of the hydrogen atoms in the above named hydrocarbon groups with substituent atoms and/or groups such as halogen atoms, cyano groups and the like, e.g. chloromethyl, 3,3,3-trifluoropropyl, 2-cyanoethyl and 3-cyanopropyl groups, and the subscript a is a number in the range from 1.90 to 2.05. The diorganopolysiloxane should preferably have a viscosity of at least 25 centistokes at 25° C. in order that the cured product of the RTV composition may have good rubbery elasticity and excellent mechanical strengths.

Although the base ingredient of the inventive RTV composition is the above defined diorganopolysiloxane as the component (A-1), it is optional that the base ingredient of the composition is a combination of the component (A-1) and another diorganopolysiloxane of which the terminal silicon atom does not have a silanolic hydroxy group or two alkoxy groups but the terminal group is, for example, a trimethylsilyl group. The amount of such a diorganopolysiloxane having no terminal functionality, however, should not exceed the amount of the component (A-1).

The component (A-2) is a filler which may be any of those conventionally used in the RTV compositions including inorganic and organic ones exemplified by siliceous fillers, e.g. finely pulverized quartz, fused quartz glass powder, silica aerogel, precipitated silica and diatomaceous earth, metal oxides, e.g. iron oxide, zinc oxide and titanium dioxide, metal carbonates, e.g. calcium carbonate, magnesium carbonate and zinc carbonate, asbestos, glass wool, carbon black, fine mica flakes, powders of a synthetic resin, e.g. polystyrene, polyvinyl chloride and polypropylene, and so on. The amount of the filler in the inventive RTV composition should be in the range from 1 to 400 parts by weight or, preferably, from 5 to 200 parts by weight per 100 parts by weight of the component (A-1). When the amount of the filler is too small, the RTV composition would not give a cured product having excellent mechanical strengths. When the amount of the filler is too large, on the other hand, a great difficulty is encountered in compounding the components into a uniform composition and, if a uniform composition could be obtained in one way or another, the cured product of the composition would be too hard and has no sufficient mechanical properties as a rubber.

The component (A-3) is an alkenyloxy-containing silane compound represented by the general formula (I), which serves as a silylating agent for the water content and the silanolic hydroxy groups in the components (A-1) and (A-2) so as to improve the storage stability of the composition. In the general formula (I), the group denoted by $R^1$ is selected from the class consisting of methyl, ethyl, propyl, vinyl, phenyl and 3,3,3-trifluoropropyl groups and the group denoted by X is an alkenyloxy group represented by the general formula (II), in which $R^2$ and $R^3$ are each a hydrogen atom or an alkyl group, e.g. methyl, ethyl and propyl groups. The subscript n in the general formula (I) is zero or 1 so that the alkenyloxysilane compound should have three or four alkenyloxy groups in a molecule.

Examples of the alkenyloxy-containing silane compound particularly suitable as the component (A-3) include: methyl trivinyloxy silane; methyl tri(isopropenyloxy) silane; vinyl tri(isopropenyloxy) silane; phenyl tri(isopropenyloxy) silane; methyl tri(1-phenylethenyloxy) silane; methyl tri(isobuten-1-yloxy) silane; methyl tri(1-methylpropen-1-yloxy) silane; methyl tri(1,4-dimethylpentadien-1,3-yloxy) silane; and the like. Partial hydrolysis products of these alkenyloxy-containing silanes can be used as the component (A-3).

The amount of the component (A-3) in the inventive RTV composition should be at least equimolar to or, preferably, in the range from 1 to 2 moles per mole of the silanolic hydroxy groups and the water content in the components (A-1) and (A-2). An amount in the range from 0.1 to 5 parts by weight is usually sufficient per 100 parts by weight of the component (A-1). When the amount thereof is too small, the silylating effect is of course insufficient. When the amount is too large, no particularly additional advantageous effects can be obtained thereby rather there is an economical disadvantage.

The component (A-4) is an organosilicon compound, i.e. an organosilane or organopolysiloxane compound, having, in a molecule, at least one guanidino group represented by the general formula (III), which serves as a catalyst for the silylating reaction by the above described component (A-3). In the general formula (III), $R_4$ is a hydrogen atom or a monovalent hydrocarbon group which is preferably a methyl, ethyl, propyl or phenyl group. The guanidino group of the general formula (III) may be bonded to the silicon atom in the organosilicon compound through a divalent group which is preferably an alkylene group, e.g. propylene group of the formula —$CH_2CH_2CH_2$—, or an oxyalkylene group of the formula such as —CH$_2$CH$_2$—O—CH$_2$CH$_2$CH$_2$—.

Particular examples of such a guanidino-containing organosilicon compound include: 3-(1,1,3,3-tetramethylguanidino)propyl trimethoxy silane; 3-(1,1,3,3-tetramethylguanidino)propyl methyl dimethoxy silane; 3-(1,1,3,3-tetramethylguanidino)propyl dimethyl methoxy silane; and 2-(1,1,3,3-tetramethylguanidino)ethyl-1,1-diethoxy-3,3,3-trimethyl disiloxane as well as those expressed by the formulas (EtPrN)(MeEtN)C=N—CH$_2$CH$_2$CH$_2$C-H$_2$—Si(—O—CMe=CH$_2$)$_3$;

(Me$_2$N)$_2$C=N—CH$_2$CH$_2$CH$_2$—SiMe(—O—N=CMeEt)$_2$;

(PhMeN)$_2$C=N—CH$_2$CH$_2$—O—CH$_2$CH$_2$C-H$_2$—Si(—NMeEt)$_3$; and

MeO—(SiMe$_2$—O—)$_{50}$—[—SiMe(CH$_2$CH$_2$CH$_2$Gu)—O—]$_{50}$—Me, in which the symbols Me, Et, Pr, Ph and Gu denote methyl, ethyl, propyl, phenyl and 1,1,3,3-tetramethylguanidino groups, respectively. Among the above given guanidino-containing organosilicon compound, the most preferable is 3-(1,1,3,3-tetramethylguanidino) propyl trimethoxy silane in view of the simplicity of the synthetic preparation thereof.

The amount of the component (A-4) in the inventive RTV composition should be in the range from 0.01 to 10 parts by weight or, preferably, from 0.1 to 5 parts by weight per 100 parts by weight of the component (A-1). When the amount thereof is too small, the silylating reaction of the component (A-3) is promoted only insufficiently so that the reaction may take an unduly long time and the storage stability of the RTV composition cannot be improved as desired. When the amount of the component (A-4) is too large, on the other hand, the RTV composition is sometimes colored yellow, not to mention the economical disadvantage due to the expensiveness of the compound.

The component (A-5) is an alcohol compound represented by the general formula (IV), in which R$^5$ is a monovalent hydrocarbon group or, preferably, an alkyl group. Exemplary of the alcohol compound are methyl alcohol, ethyl alcohol, propyl alcohol, butyl alcohol, 2-ethylhexyl alcohol, n-octyl alcohol and the like, of which methyl and ethyl alcohols are preferred.

The role played by the component (A-5) is to convert the Si-X groups of the component (A-3) into alkoxy groups after the silylating reaction thereof with the silanol groups and water content in the components (A-1) and (A-2). Accordingly, the amount of the alcohol compound as the component (A-5) should be at least equimolar to or, preferably, in the range from 1.0 to 1.5 moles per mole of the groups denoted by X in the component (A-3) but, in any event, the amount should not exceed 10 parts by weight per 100 parts by weight of the component (A-1).

The component (B) in the inventive RTV composition is an organosilicon compound, i.e. organosilane or organopolysiloxane compound, having, in a molecule, at least one silicon-bonded hydrogen atom. This component serves as a remover agent of any excess amount of the alcohol compound as the component (A-5) so that this component could be omitted if the component (A) is so formulated that no such excess amount of the alcohol compound is left in the component (A) after compounding the components (A-1) to (A-5). It is, however, not practical to completely remove the excess amount of the alcohol compound taking an unduly long time of mixing of the mixture under reduced pressure so that this component is industrially indispensable. The amount of the component (B) in the inventive composition should be sufficient to provide the silicon-bonded hydrogen atoms in an amount not to exceed equimolar to but not smaller than 0.3 time by moles of the alcohol compound as the component (A-5) since the silicon-bonded hydrogen atoms react with the alcohol compound to form alkoxysilyl groups in a 1:1 molar ratio in the presence of the guanidino-containing organosilicon compound as the component (A-4).

Suitable organosilane compound having a silicon-bonded hydrogen atom is exemplified by trimethoxy silane, triethoxy silane, methyl dimethoxy silane, ethyl diethoxy silane, methyl diethoxy silane, ethyl dimethoxy silane, methyl di(isopropenyloxy) silane, methyl methoxy isopropenyloxy silane, dimethoxy isopropenyloxy silane, tri(isopropenyloxy) silane, methyl isopropenyloxy silane and the like. Suitable organopolysiloxane compound having a silicon-bonded hydrogen atom is exemplified by 1,1,3,3-tetramethyl disiloxane, 1,1,1,3,5,5,5-heptamethyl trisiloxane, 1,3,5,7-tetramethyl cyclotetrasiloxane, 1,3,5,7-tetramethyl-1-propyl cyclotetra-siloxane, 1,3,5-tetramethyl-1,3,5-tripropyl cyclotetrasiloxane, 1,1,3,5,7-pentamethyl cyclotetrasiloxane, linear polysiloxanes expressed by the formulas Me$_3$Si—O—(—SiHMe—O)$_n$—(—SiMe$_2$—O—W-)$_m$—SiMe$_3$, HSiMe$_2$—O—(—SiMe$_2$—O—)$_k$—SiMe$_2$H; and HSiMe$_2$—O—(—SiHMe—O—)$_p$—(—SiMe$_2$—O—)-$_q$—SiHMe$_2$, in which n, m, k, p and q are each a positive integer, and the like.

The component (C) is an organic tin compound which can be any of known organic tin compounds conventionally used as a catalyst for the condensation reaction in the dealcoholation type RTV compositions including carboxylates of tin, e.g. tin naphthenate, tin caprylate and tin oleate, dibutyl tin diacetate, dibutyl tin dioctoate, dibutyl tin dilaurate, dibutyl tin dioleate, diphenyl tin diacetate, dibutyl tin oxide, dibutyl tin dimethoxide, dibutyl bis(triethoxysiloxy) tin, dibutyl tin dibenzylmaleate and the like. The amount of the component (C) in the inventive RTV composition should be in the range from 0.01 to 10 parts by weight or, preferably, from 0.1 to 2 parts by weight per 100 parts by weight of the component (A-1). When the amount thereof is too small, the curing velocity of the composition would be unduly low and, in particular, no complete curing of the composition can be achieved in the core portion of a thick body due to the deficiency in the catalytic activity. When the amount of the component (C) is too large, on the other hand, the storage stability of the composition is more or less decreased.

The component (D), which is optional in the inventive RTV composition, is an alkoxy silane compound represented by the general formula (V), in which R$^6$ is a monovalent group selected from the class consisting of methyl, ethyl, propyl, vinyl, phenyl and 3,3,3-trifluoropropyl groups and R$^7$ is an alkyl group, e.g. methyl, ethyl, propyl and butyl groups, or an alkoxy-substituted alkyl group, e.g. 2-methoxyethyl and 2-ethoxyethyl groups. Exemplary of suitable alkoxy silane compound are methyl trimethoxy silane, vinyl trimethoxy silane, tetraethoxy silane, methyl triethoxy silane, ethyl trimethoxy silane, methyl tri(isopropoxy) silane, phenyl trimethoxy silane, phenyl tri(2-methoxyethoxy) silane, phenyl trimethoxy silane, phenyl tri(2-methoxyethoxy) silane, vinyl tri(2-methoxyethoxy) silane, tetra(2-ethoxyethoxy) silane, 3,3,3-trifluoropropyl trimethoxy silane and the like. Partial hydrolysis-condensation products of these alkoxy silane compounds can be used in place of the silane compound. Particularly preferable among the above named ones are methyl trimethoxy silane, vinyl trimethoxy silane, phenyl trimethoxy silane, methyl tri(2-methoxyethoxy) silane and vinyl tri(2-methoxyethoxy) silane.

The amount of the component (D) in the inventive RTV composition, when added, should not exceed 50 parts by weight per 100 parts by weight of the overall amount of the components (A-1) to (A-5). When the amount thereof is too large, the RTV composition would not give a cured product having good rubbery elasticity if not to mention the economical disadvantage.

Though not particularly limitative, the inventive RTV composition comprising the above described components is prepared by the following procedure. Namely, the diorganopolysiloxane as the component (A-1) and the filler as the component (A-2) are first blended together to give a uniform base compound, of which the content of the silanolic hydroxy groups and water is determined by analysis. Thereafter, the base compound is admixed with the components (A-3) and (A-4) and then with the component (A-5) under an anhydrous condition or under reduced pressure. After analysis of the thus obtained mixture for the content of the residual alcohol compound as the component (A-5), the mixture is further admixed with the components (B), (C) and, optionally, (D) and thoroughly blended under reduced pressure to give a uniform composition.

It is optional that the inventive RTV composition is admixed with various kinds of known additives conventionally used in RTV compositions including thixotropy modifiers, e. g. polyethylene glycol and derivatives thereof, coloring agents, e. g. pigments and dyes, aging retarders, antioxidants, antistatic agents, flame retardants, e.g. antimony oxide and chlorinated paraffins, thermal conductivity improvers, e.g. boron nitride and aluminum oxide, adhesion improvers, so-called carbon-functional silanes having, for example, amino, epoxy and mercapto groups, metal carboxylates, metal alcoholates and so on. If desired, the RTV composition may be admixed and diluted with an organic solvent such as hydrocarbon solvents, e.g. toluene and petroleum ether, ketones, esters and the like.

The RTV composition of the present invention can be cured into a rubbery elastomer when it is exposed to an atmosphere containing moisture while it is stable over a prolonged period of time under a hermetically sealed condition with exclusion of moisture. The storage stability of the composition is so high that even a composition after storage for six months or longer can be rapidly cured when it is exposed to a moisture-containing atmosphere to give a rubbery elastomer having excellent mechanical properties. Moreover, no toxic or corrosive gas is produced by the curing reaction of the composition so that the composition can be used without the problems of safety and rust formation on any metallic substrate surface. In addition, very firm adhesion is obtained between the cured composition and the surface of various kinds of substrates or, in particular, of metals on which the inventive RTV composition has been cured. Accordingly, the inventive RTV compositions, having these unique and advantageous characteristics, are useful not only as an adhsive for electric and electronic parts but also as a sealant, caulking material, water-repellent agent, coating agent and mold-release agent on various kinds of substrate materials as well as a finishing agent of fabrics.

In the following, the RTV composition of the present invention is described in more detail by way of examples, in which the term "parts" always refers to "parts by weight" and the values of viscosity are all those obtained by the measurement at 25° C.

EXAMPLE 1

A base compound was prepared by uniformly blending 88 parts of a dimethylpolysiloxane having a viscosity of 20,000 centistokes and terminated at each molecular chain end with a silanolic hydroxy group, 9 parts of a fumed silica filler surface-blocked with trimethyl silyl groups and 3 parts of another fumed silica filler surface-treated with a cyclic dimethylpolysiloxane oligomer. The total content of the silanolic hydroxy groups and water contained in this base compound was 0.0102 mole/100g.

In the next place, 100 parts of this base compound was admixed with 2.5 parts of vinyl tri(isopropenyloxy) silane corresponding to 1.09 moles per mole of the total amount of the silanolic hydroxy groups and water and 0.5 part of 3-(1,1,3,3-tetramethylguanidino)propyl trimethoxy silane and uniformly blended under exclusion of atmospheric moisture. Thereafter, the blend was further admixed with 2 parts of methyl alcohol and thoroughly blended first under exclusion of atmospheric moisture for 15 minutes and then under reduced pressure for 30 minutes. The thus obtained compound contained 0.025 mole/100 g of free methyl alcohol.

The compound was then admixed with 1.7 parts of a methylhydrogenpolysiloxane expressed by the formula $Me_3Si-O-(-SiHMe-O-)_{20}-SiMe_3$ and blended for 30 minutes under reduced pressure. The amount of the methylhydrogenpolysiloxane was sufficient to provide 0.9 mole of the silicon-bonded hydrogen atoms per mole of the methyl alcohol. The compound was further admixed with 5 parts of methyl trimethoxy silane and 0.2 part of dibutyl tin dimethoxide and thoroughtly blended under reduced pressure to give a RTV composition.

This RTV composition was shaped by extrusion into a sheet of 2 mm thickness which was exposed to an atmosphere of 55% relative humidity at 23° C. to find that the surface thereof was tackfree after 5 minutes. When the sheet was kept standing for 7 days in the same atmosphere as above, the sheet was cured and converted into a rubbery sheet of which the mechanical properties were measured according to the procedures specified in JIS K 6301 to give the results shown in Table 1 below. Separately, the same tests of curing and measurements of the mechanical properties of the cured rubber sheets were undertaken as above after storage of the RTV composition in a hermetically sealed container for 7 days at 70° C. and for 6 months at 23° C. to give the results also shown in Table 1, from which it was understood that the RTV composition prepared in the above described manner was very stable in storage under exclusion of moisture.

TABLE 1

| RTV composition | Hardness, JIS | Ultimate elongation, % | Tensile strength, kg/cm² |
|---|---|---|---|
| As prepared | 25 | 410 | 17 |
| After 7 days at 70° C. | 25 | 410 | 17 |
| After 6 months at 23° C. | 25 | 400 | 16 |

EXAMPLES 2 TO 6 AND COMPARATIVE EXAMPLES 1 TO 4

Nine RTV compositions were prepared each in the same manner as in Example 1 from 100 parts of the base compound prepared in Example 1 except that the kinds and amounts of the additive components to the base compound were as indicated in Table 2 below. In the table, the alkenyloxy silanes I, II and III are vinyl tri(isopropenyloxy) silane, methyl tri(isopropenyloxy) silane and phenyl tri(isopropenyloxy) silane, respectively, the Si-H compounds I, II, III and IV are trimethoxy silane, methyl dimethoxy silane, 1,1,3,3-tetramethyl disiloxane and 1,3,5,7-tetramethyl cyclotetrasiloxane, respectively, and the alkoxy silanes I and II are methyl trimethoxy silane and vinyl trimethoxy silane, respectively. The guanidinosilane in the table is 3-(tetramethylguanidino)propyl trimethoxysilane. In each of the formulations, 0.4 part of dibutyl tin dimethoxide was added to the respective composition as a catalyst. Table 2 also shows the molar ratio of the alkenyloxy silane and the total amount of the silanolic hydroxy groups and water as "alkenyloxy silane/(OH+H₂O)" and the molar ratio of the silicon-bonded hydrogen atoms to methyl alcohol as "SiH/MeOH" for each of the formulations.

Each of the compositions excepting the composition in Comparative Example 3, in which the mixture of the components showed great increase of the viscosity not to allow uniform blending of the composition, was subjected to the same tests of curing and measurements of the mechanical properties of the cured rubber sheets as well as the tack-free time as in Example 1 either as prepared or after storage for 7 days at 70° C. and for 6 months at 23° C. under a hermetically sealed condition to give the results shown in Table 3. No cured rubber sheet could be obtained in Comparative Example 1 after storage of the composition and the composition in Comparative Example 4 was no longer suitable for use due to formation of foams by gas evolution during the storage period.

TABLE 2

|  |  | Example | | | | | Comparative Example | | | |
|---|---|---|---|---|---|---|---|---|---|---|
|  |  | 2 | 3 | 4 | 5 | 6 | 1 | 2 | 3 | 4 |
| Alkenyloxysilane, parts | I | 3.0 | — | — | 2.5 | — | — | 2.5 | 1.5 | 2.5 |
|  | II | — | 2.5 | — | — | 3.0 | — | — | — | — |
|  | III | — | — | 3.0 | — | — | — | — | — | — |
| Guanidinosilane, parts |  | 0.5 | 0.5 | 0.5 | 0.5 | 0.5 | 0.5 | — | 0.5 | — |
| Methyl alcohol, parts |  | 2.5 | 2.0 | 1.5 | 1.5 | 3.0 | — | — | — | 2.0 |
| Si—H compound, parts | I | 4.6 | — | — | — | — | — | — | — | — |
|  | II | — | 3.0 | — | — | 2.8 | — | — | — | — |
|  | III | — | — | 1.4 | — | — | — | — | — | — |
|  | IV | — | — | — | 0.45 | — | — | — | — | 2.8 |
| Alkoxy silane, parts | I | 5.0 | 5.0 | 5.0 | 5.0 | — | — | — | 5.0 | 5.0 |
|  | II | — | — | — | — | 5.0 | 7.0 | 5.0 | — | — |
| Alkenyloxysilane/(OH + H₂O) |  | 1.30 | 1.15 | 1.07 | 1.09 | 1.38 | 0 | 1.09 | 0.65 | 1.09 |
| SiH/MeOH |  | 1.0 | 0.9 | 0.85 | 0.8 | 0.7 | — | — | — | 1.5 |

TABLE 3

| RTV composition | Properties | Example | | | | | Comparative Example | | | |
|---|---|---|---|---|---|---|---|---|---|---|
|  |  | 2 | 3 | 4 | 5 | 6 | 1 | 2 | 3 | 4 |
| As prepared | Tack-free time, minutes | 6 | 7 | 9 | 6 | 6 | 10 | 10 | — | 6 |
|  | Hardness, JIS | 24 | 24 | 25 | 26 | 25 | 19 | 20 | — | 23 |
|  | Ultimate elongation, % | 400 | 390 | 420 | 390 | 400 | 280 | 300 | — | 300 |
|  | Tensile strength, kg/cm² | 15 | 14 | 13 | 16 | 15 | 10 | 11 | — | 10 |
| After 7 days at 70° C. | Tack-free time, minutes | 5 | 7 | 8 | 5 | 6 | — | 60 | — | — |
|  | Hardness, JIS | 26 | 25 | 26 | 28 | 26 | — | 10 | — | — |
|  | Ultimate elongation, % | 410 | 400 | 430 | 400 | 400 | — | 150 | — | — |
|  | Tensile strength, kg/cm² | 17 | 15 | 15 | 18 | 15 | — | 7 | — | — |
| After 6 months at 23° C. | Tack-free time, minutes | 6 | 7 | 9 | 6 | 6 | — | 60 | — | — |
|  | Hardness, JIS | 25 | 25 | 25 | 27 | 25 | — | 10 | — | — |
|  | Ultimate elongation, % | 400 | 400 | 415 | 400 | 410 | — | 160 | — | — |
|  | Tensile strength, kg/cm² | 16 | 15 | 14 | 16 | 16 | — | 8 | — | — |

EXAMPLES 7 TO 9 AND COMPARATIVE EXAMPLES 5 AND 6

A base compound was prepared in the same formulation as in the preparation of the base compound in Example 1 except that the silanol-terminated dimethylpolysiloxane was replaced with the same amount of another dimethylpolysiloxane having a viscosity of 20,000 centistokes and terminated at each molecular chain end with a methyl dimethoxy silyl group. The thus prepared base compound contained silanolic hydroxy groups and water in a total amount of 0.0068 mole per 100 g.

Five RTV compositions were prepared each in the same manner as in Example 1 from 100 parts of the base compound with admixture of a varied amount of an alkenyloxy silane, i.e. vinyl tri(isopropenyloxy) silane, 0.5 part of 3-(1,1,3,3-tetramethylguanidino)propyl trimethoxy silane, a varied amount of methyl alcohol, a varied amount of a polysiloxane compound having silicon-bonded hydrogen atoms indicated below, 5.0 parts of methyl trimethoxy silane and 0.4 part of dibutyl tin dimethoxide. The varied amounts of the components are shown in Table 4 below. The H-Siloxanes I, II and III indicated in the table are: a linear polysiloxane of the formula Me$_3$Si—O—(—SiHMe—O)$_{10}$—(—SiMe$_2$—O—)$_{10}$-SiMe$_3$; 1,1,1,3,4,4,4-heptamethyl trisiloxane; and 1,3,5,7-tetramethyl-1,3-dipropyl cyclotetrasiloxane, respectively.

Each of the thus prepared compositions was subjected to the same tests of curing and measurments of the mechanical properties of the cured rubber sheets as in Example 1 either as prepared or after storage for 7 days at 70° C. and for 6 months at 23° C. under a hermetically sealed condition to give the results shown in Table 4 below. No uniform RTV composition could be obtained in Comparative Example 5 due to foaming of the mixture under blending.

atoms to methyl alcohol of 0.9 and blended together for 30 minutes under reduced pressure. Thereafter, the compound was further admixed with 5 parts of methyl trimethoxy silane and 0.2 part of dibutyl tin dimethoxide and thoroughly blended under reduced pressure to give a RTV composition.

The thus prepared RTV composition was subjected to the same tests of curing and measurements of the mechanical properties of the cured rubber sheets as in Example 1 either as prepared or after storage for 7 days at 70° C. or 6 months at 23° C. under a hermetically sealed condition to give the results shown in Table 5 below. The tack-free time of the composition as prepared was 5 minutes in an atmosphere of 55% relative humidity at 23° C. and unchanged by storage.

TABLE 5

| RTV composition | Hardness, JIS | Ultimate elongation, % | Tensile strength, kg/cm$^2$ |
|---|---|---|---|
| As prepared | 25 | 560 | 22 |
| After 7 days at 70° C. | 25 | 550 | 21 |
| After 6 months at 23° C. | 25 | 550 | 20 |

TABLE 4

| | | Example | | | Comparative Example | |
|---|---|---|---|---|---|---|
| | | 7 | 8 | 9 | 5 | 6 |
| Alkenyloxysilane, parts | | 1.8 | 2.5 | 1.8 | 1.0 | 2.0 |
| H-siloxane, parts | I | 4.2 | — | — | — | — |
| | II | — | 6.2 | — | — | — |
| | III | — | — | 6.7 | — | — |
| Alkenyloxysilane/(DH + H$_2$O) | | 1.17 | 1.63 | 1.17 | 0.15 | 1.30 |
| SiH/MeOH | | 1.9 | 0.9 | 0.9 | — | 0 |
| As prepared | Tack-free time, minutes | 5 | 6 | 5 | — | 15 |
| | Hardness, JIS | 24 | 26 | 25 | — | 22 |
| | Ultimate elongation, % | 410 | 400 | 410 | — | 430 |
| | Tensile strength, g/cm$^2$ | 16 | 15 | 16 | — | 16 |
| After 7 days at 70° C. | Tack-free time, minutes | 5 | 6 | 5 | — | 120 |
| | Hardness, JIS | 26 | 26 | 26 | — | 11 |
| | Ultimate elongation, % | 420 | 410 | 420 | — | 180 |
| | Tensile strength, kg/cm$^2$ | 17 | 16 | 16 | — | 8 |
| After 6 months at 23° C. | Tack-free time, minutes | 5 | 6 | 6 | — | 90 |
| | Hardness, JIS | 25 | 26 | 26 | — | 13 |
| | Ultimate elongation, % | 410 | 410 | 420 | — | 220 |
| | Tensile strength, kg/cm$^2$ | 17 | 17 | 16 | — | 16 |

EXAMPLE 10

A base compound was prepared by uniformly blending 30 parts of a first dimethylpolysiloxane having a viscosity of 50,000 centistokes and terminated at each molecular chain end with a silanolic hydroxy group, 20 parts of a second dimethylpolysiloxane having a viscosity of 100 centistokes and terminated at each molecular chain end with a trimethyl silyl group and 50 parts of a calcium carbonate filler surface-treated with resin acid. The thus prepared base compound contained the silanolic hydroxy groups and water in a total amount of 0.0129 mole per 100g.

The thus prepared base compound in an amount of 100 parts was admixed with 3.5 parts of vinyl tri(isopropenyloxy) silane to give a molar ratio of the silane to the total amount of the hydroxy groups and water of 1.20 and 0.5 part of 3-(1,1,3,3-tetramethylguanidino)-propyl trimethoxy silane and blended together with exclusion of moisture followed by further addition of 1.5 parts of methyl alcohol and blending first for 15 minutes with exclusion of moisture and then for 30 minutes under reduced pressure. The thus obtained compound contained 0.025 mole per 100 g of free methyl alcohol.

The compound was then admixed with 1.7 g of the same methylhydrogenpolysiloxane as used in Example 1 to give a molar ratio of the silicon-bonded hydrogen

What is claimed is:

1. A room temperature-curable organopolsiloxane composition which comprises:
   (A) a combination of
      (A-1) 100 parts by weight of a diorganopolysiloxane of which each of the silicon atoms at the molecular chain ends has a silanolic hydroxy group or two alkoxy groups directly bonded thereto,
      (A-2) from 1 to 400 parts by weight of a filler,
      (A-3) from 0.1 to 5 parts by weight of an alkenyloxy silane compound represented by the general formula $$R^1{}_n Si X_{4-n},$$

in which R$^1$ is a substituted or unsubstituted monovalent hydrocarbon group selected from the class consisting of methyl, ethyl, propyl, vinyl, phenyl and 3,3,3-trifluoropropyl groups, X is an alkenyloxy group represented by the general formula $$-O-C(CH_2R^3)=CHR^2$$

$R^2$ and $R^3$ each being a hydrogen atom or an alkyl group selected from the class consisting of methyl, ethyl and propyl groups, and the subscript n is zero or 1, or a partial hydrolyzate thereof, (A-4) from 0.01 to 10 parts by weight of an organosilane or organopolysiloxane compound having, in a molecule, at least one substituted or unsubstituted guanidino group represented by the general formula $$-N=C(NR^4{}_2)_2,$$

in which $R^4$ is a hydrogen atom or a monovalent hydrocarbon group, and (A-5) an alcohol compound represented by the general formula $$R^5OH,$$

in which $R^5$ is a monovalent hydrocarbon group, in an amount from equimolar to 20 times by moles of the groups denoted by X in the component (A-3);

(B) an organosilane or organopolysiloxane compound having, in a molecule, at least one hydrogen atom directly bonded to the silicon atom in an amount from 0.3 to 1.0 mole per mole of the alcohol compound as the component (A-5); and (C) an organic tin compound in an amount in the range from 0.01 to 10% by weight based on the overall amount of the components (A-1) to (A-5).

2. The room temperature-curable organopolysiloxane composition as claimed in claim 1 which further comprises:

(D) an alkoxysilane compound represented by the general formula $$R^6{}_mSi(OR^7)_{4-m},$$

in which $R^6$ is a monovalent hydrocarbon group, $R^7$ is an alkyl group or an alkoxy-substituted alkyl group and the subscript m is zero or 1, or a partial hydrolyzate thereof in an amount not exceeding 50% by weight based on the overall amount of the components (A-1) to (A-5).

3. The room temperature-curable organopolysiloxane composition as claimed in claim 1 wherein the diorganopolysiloxane as the component (A-1) is a dimethylpolysiloxane having a viscosity of at least 25 centistokes at 25° C.

4. The room temperature-curable organopolysiloxane composition as claimed in claim 1 wherein the alkenyloxy group denoted by X is an isopropenyloxy group of the formula $-O-C(CH_3)=CH_2$.

5. The room temperature-curable organopolysiloxane composition as claimed in claim 1 wherein the alkenyloxy silane compound as the component (A-3) is a methyl tri(isopropenyloxy) silane.

6. The room temperature-curable organopolysiloxane composition as claimed in claim 1 wherein the guanidino group is a 1,1,3,3-tetramethyl guanidino group.

7. The room temperature-curable organopolysiloxane composition as claimed in claim 1 wherein the component (A-4) is 3-(1,1,3,3-tetramethylguanidino)propyl trimethoxy silane.

8. The room temperature-curable organopolysiloxane composition as claimed in claim 1 wherein the alcohol compound as the component (A-5) is methyl alcohol or ethyl alcohol.

9. The room temperature-curable organopolysiloxane composition as claimed in claim 1 wherein the amount of the alcohol compound as the component (A-5) is in the range from 1.0 to 1.5 moles per mole of the groups denoted by X in the component (A-3).

10. The room temperature-curable organopolysiloxane composition as claimed in claim 2 wherein the alkoxysilane compound as the component (D) is selected from the class consisting of methyl trimethoxy silane, vinyl trimethoxy silane, phenyl trimethoxy silane, methyl tri(2-methoxyethoxy) silane and vinyl tri(2-methoxyethoxy) silane.

* * * * *